(12) United States Patent
Ichikawa et al.

(10) Patent No.: US 7,344,378 B2
(45) Date of Patent: *Mar. 18, 2008

(54) SCIENTIFIC PHENOMENA EVALUATION DEVICE, EDUCATIONAL TOOL FOR SCIENTIFIC EXPERIMENTS AND MANUFACTURING METHOD OF THE DEVICE AND TOOL

(75) Inventors: Yasunori Ichikawa, Minami-Ashigara (JP); Tomohide Ueyama, Minami-Ashigara (JP); Fumiko Shiraishi, Minami-Ashigara (JP); Tetsuo Kurahashi, Minami-Ashigara (JP)

(73) Assignee: FUJIFILM Corporation, Tokyo (JP)

(*) Notice: Subject to any disclaimer, the term of this patent is extended or adjusted under 35 U.S.C. 154(b) by 272 days.

This patent is subject to a terminal disclaimer.

(21) Appl. No.: 11/060,540

(22) Filed: Feb. 18, 2005

(65) Prior Publication Data

US 2005/0191607 A1    Sep. 1, 2005

(30) Foreign Application Priority Data

Feb. 20, 2004   (JP)   .............................. 2004-045317

(51) Int. Cl.
    *G09B 23/06* (2006.01)
(52) U.S. Cl. ...................... 434/283; 434/276
(58) Field of Classification Search ............... 434/126, 434/276, 283, 298, 299, 300, 370
    See application file for complete search history.

(56) References Cited

U.S. PATENT DOCUMENTS

| | | | | |
|---|---|---|---|---|
| 1,939,776 | A | * | 12/1933 | Holmes et al. ............. 434/126 |
| 1,947,605 | A | * | 2/1934 | Linney ........................ 434/370 |
| 2,848,822 | A | * | 8/1958 | Morse ......................... 434/126 |
| 3,382,593 | A | * | 5/1968 | Couch ......................... 434/126 |
| 3,564,733 | A | * | 2/1971 | Field .......................... 434/126 |
| 4,034,493 | A | | 7/1977 | Ball |
| 4,290,759 | A | * | 9/1981 | Seabourn et al. ........... 434/370 |
| 4,472,145 | A | * | 9/1984 | Freeman et al. ............ 434/298 |
| 5,242,307 | A | | 9/1993 | Reinbold |
| 6,254,396 | B1 | | 7/2001 | Stevens |
| 2006/0166177 | A1 | * | 7/2006 | Hageman ..................... 434/276 |

FOREIGN PATENT DOCUMENTS

| | | |
|---|---|---|
| DE | 200 05 052 U1 | 8/2000 |
| JP | 2000-242162 A | 9/2000 |

OTHER PUBLICATIONS

Japanese Abstract No. 2000242162, dated Sep. 8, 2000.

* cited by examiner

*Primary Examiner*—Kurt Fernstrom
(74) *Attorney, Agent, or Firm*—Sughrue Mion, PLLC (57) ABSTRACT

In the scientific phenomena evaluation device of the present invention, a plurality of elongated grooves each having a cross-sectional area of not more than 1 mm$^2$ are formed, an end of each of the plurality of flow passages joins in at one meeting point and furthermore, a liquid absorption device is provided. Therefore, it is possible to qualitatively observe scientific phenomena, such as the dispersion phenomena of molecules. Also, accuracies sufficient for experiencing high technologies, for example, various phenomena such as the diffusion phenomenon of a liquid, heat transfer phenomenon of a liquid, mixing phenomenon of liquids and chemical reactions of a liquid that occur in this fine flow passage are obtained, consumption of chemical agents and the like is small and environmental burdens are small. Therefore, this evaluation device of scientific phenomena is appropriate as an educational tool for scientific experiments.

25 Claims, 5 Drawing Sheets

SCIENTIFIC PHENOMENA EVALUATION DEVICE, EDUCATIONAL TOOL FOR SCIENTIFIC EXPERIMENTS AND MANUFACTURING METHOD OF THE DEVICE AND TOOL

BACKGROUND OF THE INVENTION

1. Field of the Invention

The present invention relates to a scientific phenomena evaluation device, an educational tool for scientific experiments and a manufacturing method of the evaluation device and educational tool and, more particularly, to a scientific phenomena evaluation device and an educational tool for scientific experiments that are inexpensive, cause only small environmental burdens and are suitable for enjoying high technologies quite easily and a manufacturing method of the evaluation device and educational tool.

2. Description of the Related Art

For scientific phenomena evaluation device and educational tools for scientific experiments, those having various constructions have hitherto been proposed (refer to the Japanese Patent Application Laid-open No. 2000-242162).

For example in the Japanese Patent Application Laid-open No. 2000-242162, there is disclosed an educational tool of science that enables natural phenomena by changes in water temperature to be observed by causing the steam in the air or the water or steam contained in a container to be cooled or frozen, and this educational tool of science is small in size and simple in construction and is said to be able to faithfully reproduce various kinds of natural phenomena by changes in water temperature.

For chemical experimental devices for educational purposes, experimental kits such as "Science and Learning - Experimental Kit Series", "Science for Grownups - Analysis Kits for the Global Environment", and the like have been placed on the market. These experimental kits are on sale with relatively low prices of several hundreds to three thousand yen or so. They are experimental kits that give dreams to children and the pleasure of experiments to users and are enjoying great popularity.

SUMMARY OF THE INVENTION

However, conventional scientific phenomena evaluation devices of this kind as described in the Japanese Patent Application Laid-open No. 2000-242162 are relatively complicated in construction, and it is difficult to supply them at low prices. Therefore, they are not suitable for the purchase by all students of a class.

On the other hand, experimental kits having relatively simple construction are mostly relatively low priced and suitable for the purchase and use by all students of a class. However, many of such experimental kits are insufficient in terms of finishing accuracy and the consumption of chemical agents and the like is large. Therefore, when all students of a class use such experimental kits, this causes environmental burdens in terms of waste liquid treatment, for example, and this is undesirable.

Furthermore, the contents of experiments capable of being experienced with conventional experimental kits are classical scientific experimental methods, and it is only with very limited conventional experimental kits that students can enjoy high technologies quite easily.

The present invention has been made in view of the above circumstances and has as its object the provision of a scientific phenomena evaluation device and an educational tool for scientific experiments that are inexpensive, cause only small environmental burdens and are suitable for enjoying high technologies quite easily, and a manufacturing method of the evaluation device and educational tool.

To achieve the above object, the present invention provides a scientific phenomena evaluation device, comprising: a base plate on a plate-like surface of which there are formed a plurality of long or elongated grooves each having a cross-sectional area of not more than 1 $mm^2$; and a cover plate that is disposed on a surface of the base plate in close contact therewith and forms a plurality of fine flow passages on the base plate by covering the long grooves, wherein an end of each of the plurality of flow passages joins in at one meeting point, the other end of each of the plurality of flow passages is in communication with a liquid reservoir each having a volume of 5 to 5000 $mm^3$, a liquid absorption device is provided in one or more of the liquid reservoirs, and scientific phenomena in the flow passages can be visually recognized.

According to the invention, a plurality of long grooves each having a cross-sectional area of not more than 1 $mm^2$ are formed, an end of each of the plurality of flow passages joins in at one meeting point and furthermore, a liquid absorption device is provided. Therefore, it is possible to qualitatively observe scientific phenomena, such as the dispersion phenomena of molecules. Also, accuracies sufficient for experiencing high technologies, for example, various phenomena such as the diffusion phenomenon of a liquid, heat transfer phenomenon of a liquid, mixing phenomenon of liquids and chemical reactions of a liquid (for example, an acid-alkali reaction, a hydrolysis reaction) that occur in this fine flow passage are obtained, consumption of chemical agents and the like is small and environmental burdens are small. Therefore, the scientific phenomena evaluation device is appropriate as an educational tool for scientific experiments.

Incidentally, the cross-sectional area of the fine flow passage is preferably not more than 1 $mm^2$, more preferably 0.0025 to 0.64 $mm^2$, and most preferably 0.01 to 0.25 $mm^2$.

A "liquid reservoir" is usually hollow and chemical agents and the like are supplied to this part when the evaluation device is operated.

To achieve the above object, the invention also provides a scientific phenomena evaluation device, comprising: a base plate on a plate-like surface of which there are formed a plurality of long grooves each having a cross-sectional area of not more than 1 $mm^2$; and a cover plate that is disposed on a surface of the base plate in close contact therewith and forms a plurality of fine flow passages on the base plate by covering the long grooves, wherein an end of a first flow passage and an end of a second flow passage meet each other at one meeting point, the two flow passages being the above-described flow passages having almost the same length, the other end of the first flow passage is in communication with a first liquid reservoir having a volume of 5 to 5000 $mm^3$, the other end of the second flow passage is in communication with a second liquid reservoir having a volume of 5 to 5000 $mm^3$, an end of a third flow passage, which is one flow passage as described above, is in communication with the meeting point, the other end of the third flow passage being in communication with a third reservoir having a volume of 5 to 5000 $mm^3$, a liquid absorption device is provided in one or more of the liquid reservoirs, and scientific phenomena in the flow passages can be visually recognized.

According to the present invention, in the evaluation device there are formed three fine flow passages each having a cross-sectional area of 1 mm², an end of each of the flow passages join in at one meeting point, and furthermore a liquid absorption device is provided. Therefore, it is possible to qualitatively observe scientific phenomena, such as the dispersion phenomena of molecules. Also, accuracies sufficient for experiencing high technologies are obtained, consumption of chemical agents and the like is small and environmental burdens are small. Therefore, the scientific phenomena evaluation device of the present invention is appropriate as an educational tool for scientific experiments.

In the invention, it is preferred that the base plate and/or the cover plate be transparent. Also, in the invention, it is preferred that the base plate and/or the cover plate be formed from a resin material. When the base plate and/or the cover plate is transparent, scientific phenomena in the flow passage can be visually recognized. When the base plate and/or the cover plate is formed from a resin material, the evaluation device can be supplied at low cost.

Also, in the invention, it is preferred that the liquid absorption device be a device that reduces the pressure in the interior of the third liquid reservoir. By reducing the pressure in the interior of the third liquid reservoir in this manner, various kinds of experiments can be easily performed.

To achieve the above object, the present invention provides a manufacturing method of the scientific phenomena evaluation device, comprising the steps of: applying a resin material to a surface of a reverse template on the surface of which a reverse shape of a long groove of the base plate is formed; causing the resin material to cure; and stripping the resin material after curing from the reverse template thereby to form the base plate.

To achieve the above object, the present invention also provides a manufacturing method of the educational tool for scientific experiments, comprising the steps of: applying a resin material to a surface of a reverse template on the surface of which a reverse shape of a long groove of the base plate is formed; causing the resin material to cure; and stripping the resin material after curing from the reverse template thereby to form the base plate.

According to the invention, because the base plate is formed by printing by use of a reverse template on the surface of which a reverse shape of the long groove is formed, it is possible to supply the base plate with good accuracy and at low cost and to make the evaluation device at low cost. Regardless of the expression "applying a resin material to a surface of a reverse template . . . ; causing the resin material to cure", a method that involves applying a resin material to the surface of the reverse template and forming the shape of the long groove by printing by use a hot press is also based on the same technical philosophy and it can be said that such a method is within the scope of the present invention.

Incidentally, scientific phenomena are various chemical phenomena, physical phenomena and the like of a liquid that occur in the above-described fine flow passage and include the diffusion phenomenon of a liquid, heat transfer phenomenon of a liquid, mixing phenomenon of liquids and chemical reactions of a liquid (for example, an acid-alkali reaction, a hydrolysis reaction).

As described above, according to the invention, in the evaluation device there are formed a plurality of fine flow passages each having a cross-sectional area of 1 mm², an end of each of the flow passages joins in at one meeting point, and furthermore a liquid absorption device is provided. Therefore, it is possible to qualitatively observe scientific phenomena, such as the dispersion phenomena of molecules. Also, accuracies sufficient for experiencing high technologies are obtained, consumption of chemical agents and the like is small and environmental burdens are small.

DETAILED DESCRIPTION OF THE PREFERRED EMBODIMENTS

Figure 1:
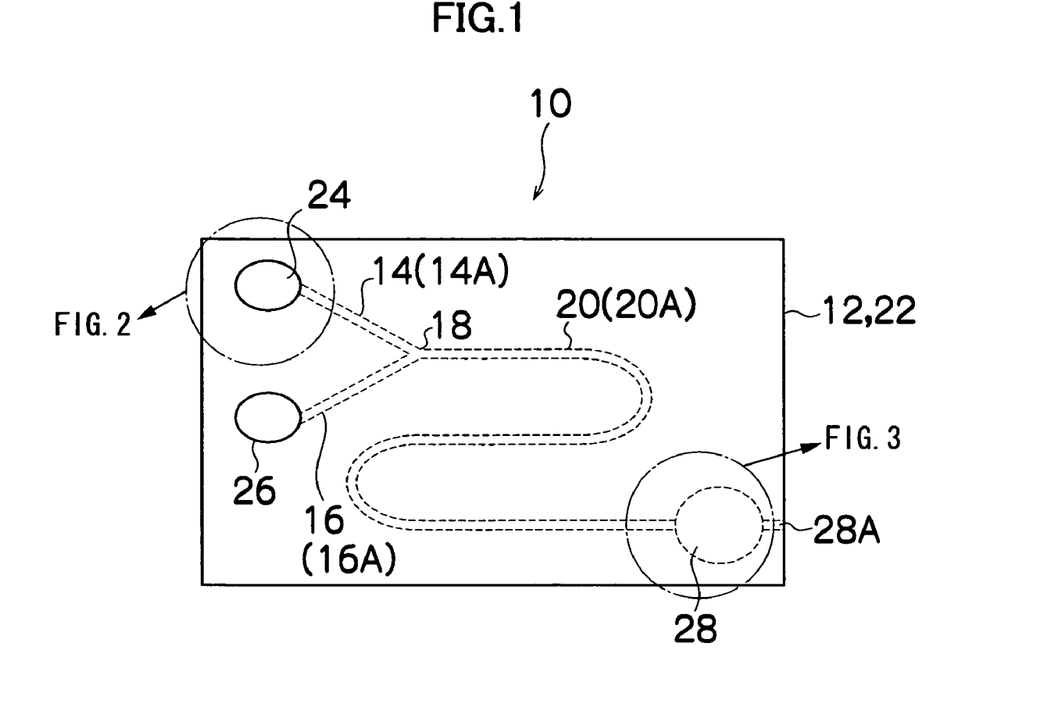
FIG. 1 is a plan view to explain the construction of a scientific phenomena evaluation device of the invention.
Figure 2:
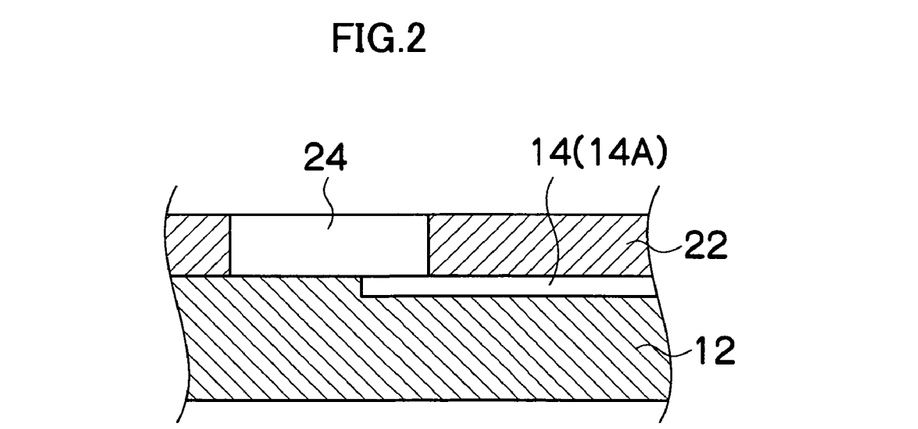
FIG. 2 is a partially enlarged view of FIG. 1.
Figure 3:
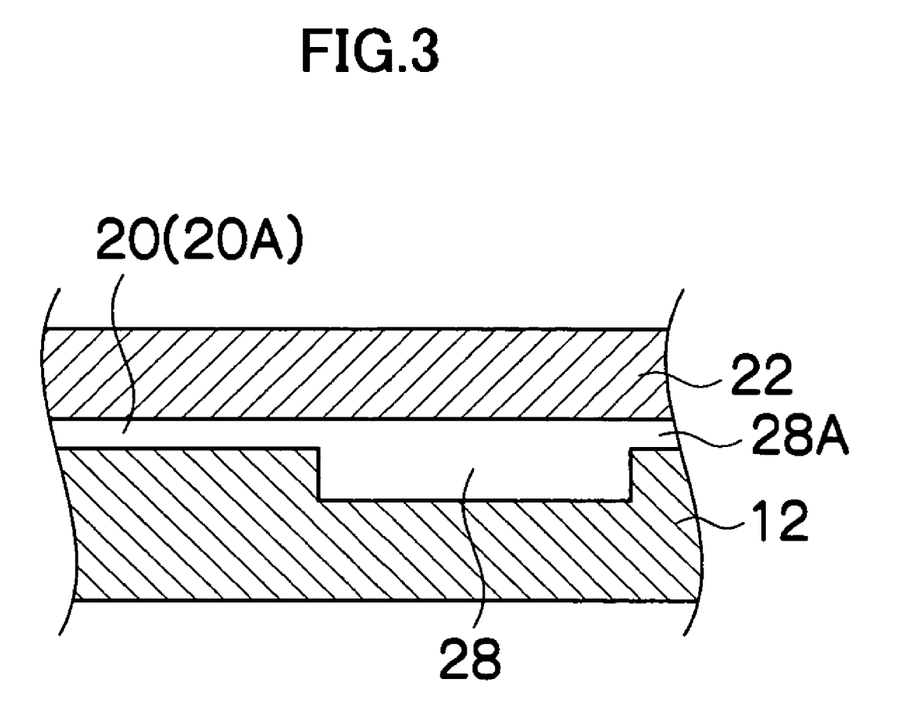
FIG. 3 is a partially enlarged sectional view of FIG. 1.

Preferred embodiments (a first embodiment) of a scientific phenomena evaluation device and an educational tool for scientific experiments according to the invention and of a manufacturing method of the evaluation device will be described in detail below with reference to the drawings. FIG. 1 is a plan view to explain the construction of an educational tool for scientific experiments 10 that is a scientific phenomena evaluation device of the present invention. FIGS. 2 and 3 are a partially enlarged section and the like of FIG. 1. FIG. 2 shows a first liquid reservoir 24 (within the dotted line up left in FIG. 1), and FIG. 3 shows a third liquid reservoir 28 (within the dotted line down right in FIG. 1).

That is, the educational tool for scientific experiments 10 is constituted by a base plate 12 on a plate-like surface of which there are formed long or elongated grooves (14, 16 and 20), each having a cross-sectional area of not more than 1 mm², a cover plate 22 that is disposed on the surface of the base plate 12 in close contact therewith and forms fine flow passages (14A, 16A and 20A) on the base plate 12 by covering the long grooves.

The fine flow passages that are formed by the long grooves (14, 16 and 20) are constituted by a first flow passage 14A and a second flow passage 16A having almost the same length, which join in at a meeting point 18, and a third flow passage 20A that joints the first flow passage 14A and the second flow passage 16A at the meeting point 18.

The other end of the first flow passage 14A is in communication with a first liquid reservoir 24, which is a cylindrical hollow part formed on the cover plate 22, the other end of the second flow passage 16A is in communication with a second liquid reservoir 26, which is a cylindrical hollow part formed on the cover plate 22, and the other end of the third flow passage 20A is in communication with a third liquid reservoir 28, which is a cylindrical hollow part formed on the base plate 12.

Furthermore, in the base plate 12 there is formed a long groove 28A that permits communication between the third liquid reservoir 28 and outside air. The long groove 28A constitutes part of the liquid absorption device, which will be described later.

It is preferred that the volume of the first liquid reservoir 24, the second reservoir 26 and the third reservoir 28 be 5 to 5000 mm³. By ensuring such volumes, the control of each phenomenon that occurs in the microchannels can be easily performed.

Although the two-dimensional size of the base plate 12 and cover plate 22 is not especially limited, from the nature of the educational tool 10 for scientific experiments that is used at school, it is possible to use portable sizes, for example, 80×50 mm. Also, the thickness of the base plate 12 and cover plate 22 is not especially limited. However, from the standpoint of strength, cost efficiency, etc., it is possible to adopt 5 mm or so, for example, for both.

Materials for the base plate 12 are not especially limited. However, from the standpoint of facilitating the manufacturing methods that will be described later, resins, more concretely, polydimethylsulfoxide (PDMS), polymethyl methacrylate (PMMA), polyvinyl chloride (PVC), ultraviolet curing resin, polycarbonate (PC), etc. can be advantageously used.

The cross-sectional area of the long grooves (14, 16 and 20) formed on the surface of the base plate 12 is preferably not more than 1 $mm^2$ as stated earlier, more preferably 0.0025 to 0.64 $mm^2$ and most preferably 0.01 to 0.25 $mm^2$. The cross-sectional shape of the long grooves (14, 16 and 20) is not especially limited and various shapes such as rectangle (square, oblong), trapezoid, V-shape and semicircle can be adopted. However, from the standpoint of facilitating the manufacturing methods that will be described later, the rectangle (square, oblong) is preferable.

Materials for the cover plate 22 are not especially limited. However, transparent materials are preferable to ensure that the scientific phenomena in the flow passages can be recognized by the visual sense. As such materials, it is possible to adopt various kinds of resin plates, more concretely, polydimethylsulfoxide (PDMS), polymethyl methacrylate (PMMA), polyvinyl chloride (PVC), ultraviolet curing resin, polycarbonate (PC), etc., various kinds of resin films, more concretely, polyethylene terephthalate (PET), polyethylene naphthalate (PEN), triacethyl cellulose (TAC), etc., and various kinds of glasses (soda-lime glass, borosilicate glass, etc.).

In general, the cover plate 22 is formed from a flat plate the front and rear surfaces of which are flat. However, it is also possible to form the front surface that corresponds to the fine flow passages (14A, 16A and 20A) in a convex shape so as to permit observation in an enlarged condition.

Incidentally, it is also possible to adopt a construction in which the cover plate 22 is opaque and the base plate 12 is transparent.

It is preferred that for the front surface (the surface on which the long grooves are formed) of the base plate 12 and the rear surface (the surface that comes into close contact with the base plate 12) of the cover plate 22, sufficient flatness be ensured for the formation of the flow passages (14A, 16A and 20A) and from the standpoint of prevention of liquid leakage etc.

Next, how to form the base plate 12 will be described. First, a reverse template on the surface of which the reverse shapes of the long grooves (14, 16 and 20) and long groove 28A (part of the liquid suction device) of the base plate 12 are formed is prepared. It is necessary that on the surface of this reverse template, the revere shape of the third liquid reservoir be further formed beforehand. As a manufacturing method of this reverse template, it is possible to adopt various kinds of publicly known micromachining processes, such as machine-working by use of a machining center and the like, electrical discharge machining, ultrasonic machining, photoetching and microdrilling.

Subsequently, a release agent is applied to the surface of this reverse template. An appropriate release agent can be adopted according to the kind of a resin material that becomes the base plate 12, working conditions (temperature etc.) and the like.

Subsequently, a resin material is applied to the surface of the reverse template and this resin material is caused to cure. When the resin material is, for example, an ultraviolet curing resin, the resin material after application is caused to cure by irradiation with ultraviolet rays. When the resin material is, for example, a thermosetting resin such as polyvinyl chloride (PVC), the resin material is applied to the surface of the reverse template 40 and hot printing is performed by use of a hot press machine.

And the resin material after curing is stripped from the reverse template.

By adopting such a method, it is possible to form the long grooves with high accuracy and at low cost and the evaluation device can be made at low cost.

Figure 6:
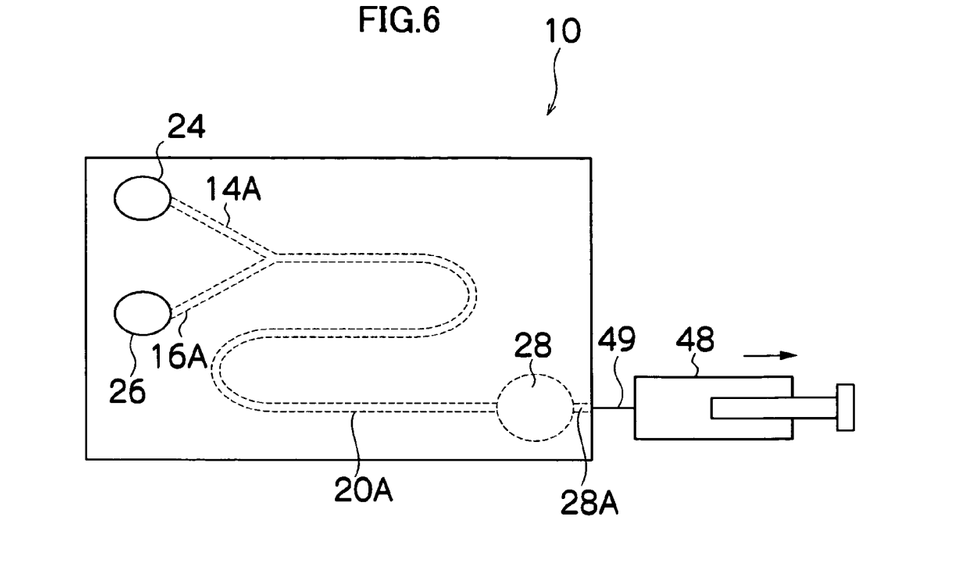
FIG. 6 is a plan view that shows the construction of a liquid suction device.

Next, how to use the educational tool for scientific experiments 10 according to the invention will be described below. As the educational tool for scientific experiments 10, it is necessary to supply the following members 1) to 10) below as a set:

1) Reverse template
2) Resin material for the base plate 12
3) Pattern form for forming the base plate 12
   (Used as a pattern form when resin is poured during the formation of the base plate 12.)
4) Cover plate 22
5) Dropper for sample liquid
   (Used to supply a necessary sample liquid (reagent) to the first liquid reservoir 24 and the second liquid reservoir 26 according to the test purpose. A dropper for exclusive use may be used for each chemical agent or one dropper may be used for all chemical agents after cleaning.)
6) Casing
   (This casing is mounted when the experimental set is assembled, in order to prevent liquid leakage from between the cover plate 22 and the base plate 12 and to prevent a breakage of the cover plate 22 and the like. Incidentally, it is possible to incorporate various functions that suit the purpose of an experiment in the casing, for example, the installation of a magnifying glass to facilitate an observation of the flow passage.)
7) Injector as liquid absorption device
   (The pressure in the interior of the third liquid reservoir 28 is reduced by using a method based on the principle of pump, and thereby a liquid is sucked into the interior. As shown in FIG. 6, the leading end of a tube 49 is attached to the opening of the long groove 28A of the base plate 12 and an injector 48 is attached to the base end of this tube 49.)
8) Sample liquid (reagent) for test
   (Necessary chemical agents that suit the purpose are supplied in reagent containers as test reagents for performing this scientific experiment. As sample liquids, for example, coloring liquids represented by coloring matter or pigments, and transparent liquids such as water can be mentioned.)
9) Practical guide for experiments
   (A guide that describes the purpose of experiments conducted by use of this set, descriptions of phenomena, applications and uses, and phenomena that can be learned with this set is attached as required.)
10) Procedural manual for experimental methods Incidentally, although in this set the base plate 12 is to be made by hand by students, when the hand-making of the base plate 12 is omitted, a complete base plate 12 can be supplied in place of the members 1) to 3) above.

Figure 4A:
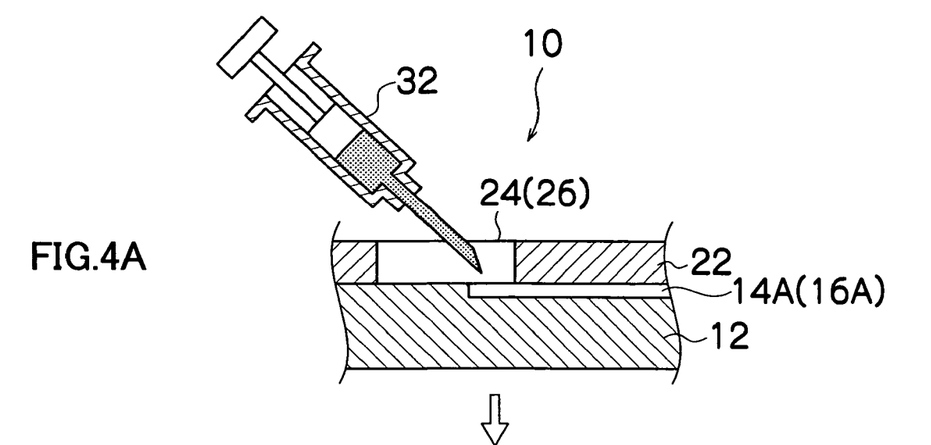
FIGS. 4A to 4C are each a sectional view that shows the procedure of an experiment.
Figure 4B:
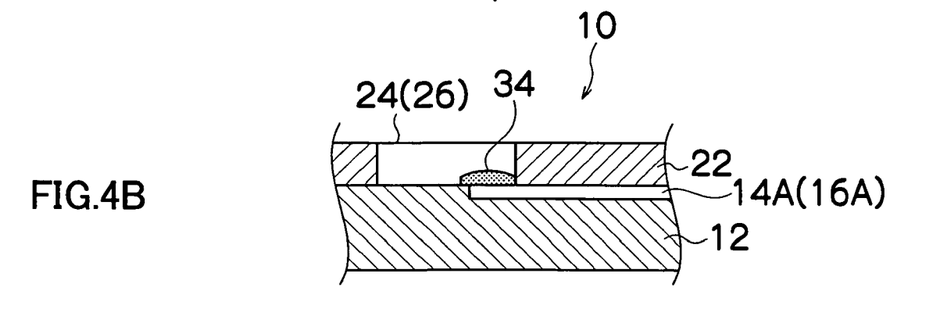
Figure 4C:
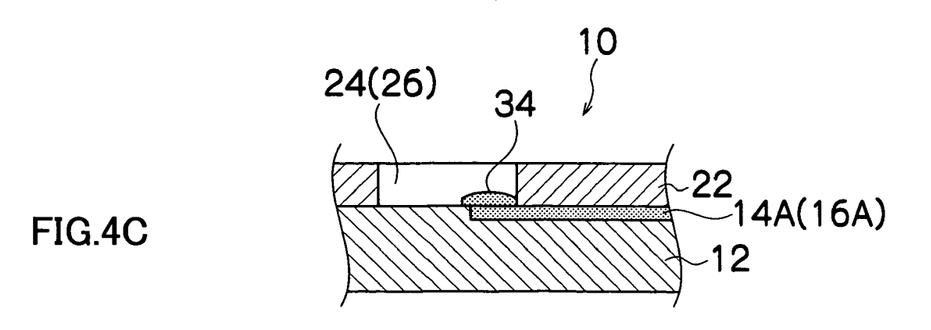
Figure 5A:
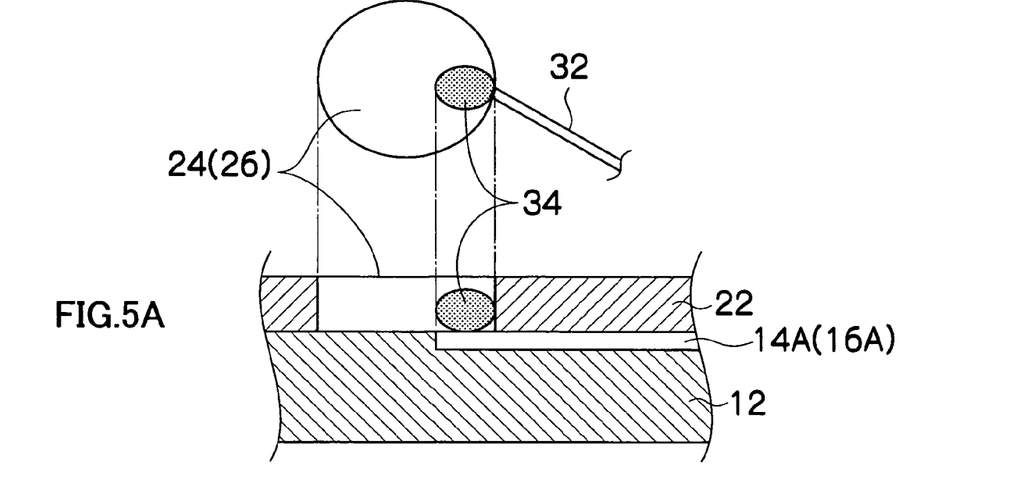
FIGS. 5A and 5B are each a sectional view that shows the procedure of an experiment.
Figure 5B:
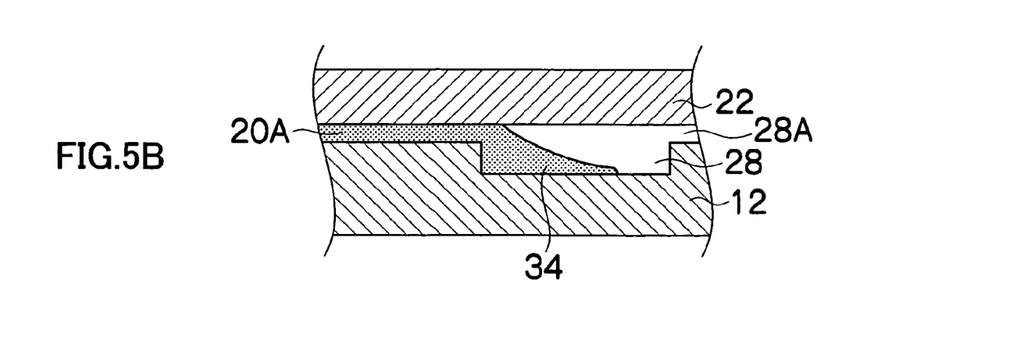

Details of experiments conducted by use of this set will be given below. FIGS. 4A to 4C and FIGS. 5A and 5B are sectional views to explain the procedure for an experimental method. FIGS. 4A to 4C show a time-series procedure in the first liquid reservoir 24 and the second liquid reservoir 26. On the other hand, FIG. 5A shows the condition of the start of an experiment in which a sample liquid is supplied to in the first liquid reservoir 24 and the second liquid reservoir 26, and FIG. 5B shows the state of the finish of the experiment in which the sample liquid has reached the third liquid reservoir 28. FIG. 6 is a plan view of the educational tool for scientific experiments 10 and a drawing to explain the liquid suction device.

First, as shown in FIG. 6, the leading end of the tube 49 is attached to the opening of the long groove 28A of the base plate 12, and the injector 48 is attached to the base end of this tube 49. The liquid suction device is formed by the above arrangement.

Subsequently, as shown in FIG. 4A, a prescribed amount of sample liquid 34 is supplied to the first liquid reservoir 24 (or the second liquid reservoir 26) by use of the syringe for sample liquid 32. As shown in FIG. 4B and FIG. 5A, this sample liquid 34 is supplied so as to block a portion that is in communication with the flow passage 14A (or 16A) in the first liquid reservoir 24 (or the second liquid reservoir 26).

In the condition shown in FIG. 4B and FIG. 5A, the air in the third reservoir 28 is sucked in by use of the injector 48 as indicated by the arrow of FIG. 6. As a result of this, as shown in FIG. 4C, the sample liquid 34 in the interior of the first liquid reservoir 24 (and the second liquid reservoir 26) is fed into the flow passage 14A (and the flow passage 16A).

As shown in FIG. 5B, the sample liquid 34 reaches the third liquid reservoir 28 by use of the above-described device and the experiment is finished. On that occasion, by delivering sample liquids 34 into the flow passage 14A and the flow passage 16A at the same time from the first liquid reservoir 24 and the second liquid reservoir 26 each, it is possible to observe how the sample liquids 34 joins in at the meeting point 18.

In particular, by changing the color of the sample liquids 34 to be supplied to the first liquid reservoir 24 and the second liquid reservoir 26, it becomes easy to observe how the sample liquids 34 join in at the meeting point 18. For example, a colored sample liquid 34 is supplied to the first liquid reservoir 24, and a transparent and colorless sample liquid 34 is supplied to the second liquid reservoir 26.

By observing the flow passage 20A behind the meeting place 18 of the sample liquids 34 that flow in this manner, a person who is carrying out the experiment can recognize how coloring molecules of the coloring matter or pigment diffuse from the side of the colored liquid flowing in the microchannels into the transparent liquid.

Furthermore, by changing not only the color of the sample liquids 34 supplied to the first liquid reservoir 24 and the second liquid reservoir 26, but also their viscosity, how the sample liquids 34 join in at the meeting point 18 can be observed in a different manner.

Incidentally, in order to ensure that these phenomena can be more easily observed, it is also possible to use a reading glass or a magnifying glass. Furthermore, as stated previously, it is also possible to give the function of a magnifying glass (the lens function) to the cover plate 22 in the flow passage 20A.

According to the educational tool for scientific experiments 10 described above, in order to ensure that children can perform scientific experiments in the microscopic world with pleasure, important parts are simplified as far as possible, thereby making it possible to supply this educational tool at low cost, and besides experiments can be conducted with high accuracy.

In particular, when the diffusion phenomena of molecules that provide the basis of chemical reactions are qualitatively observed, in order to improve the experiment accuracy, it is very important that multiple liquids flow in the flow passages be at least under the same conditions. And the educational tool of the present embodiment can sufficiently meet this requirement. That is, it is possible to conduct experiments with relatively good accuracy by use of a very simple and inexpensive device. Furthermore, because experiments are conducted in the microscopic world, consumption of chemical agents represented by coloring matter or pigments and the like is very small and environmental burdens can be substantially reduced.

Next, the second embodiment of the present invention will be described with reference to FIG. 7. Incidentally, like numerals are given to members that are the same as or similar to those of the above-described first embodiment, and the description of these members is omitted.

Unlike the first embodiment, in the second embodiment, the long groove 28A that permits communication between the third liquid reservoir 28 and outside air is not formed, and the third liquid reservoir 28 is formed in the cover plate 22. Furthermore, the tube 49 and the injector 48 as the liquid suction device are unnecessary.

Next, how to use an educational tool for scientific experiments 10' in the second embodiment will be described. In the second embodiment, the set of the educational tool for scientific experiments 10' may be almost the same as that of the first embodiment described above. However, in the second embodiment, a tape described below is necessary as the member 11) in addition to the members 1) to 10) of the educational tool for scientific experiments 10 described above.

11) Tape for sealing sample liquid inlet and outlet (Provides a cover for the third liquid reservoir 28 that is a hole for sucking a sample liquid. Used to cover the third liquid reservoir 28 before the start of an experiment.)

Details of an experiment conducted by use of this set are also almost the same as the procedure shown in FIGS. 4A to 4C and FIGS. 5A and 5B. Therefore, the description up to FIG. 4B will be omitted.

Figure 7:
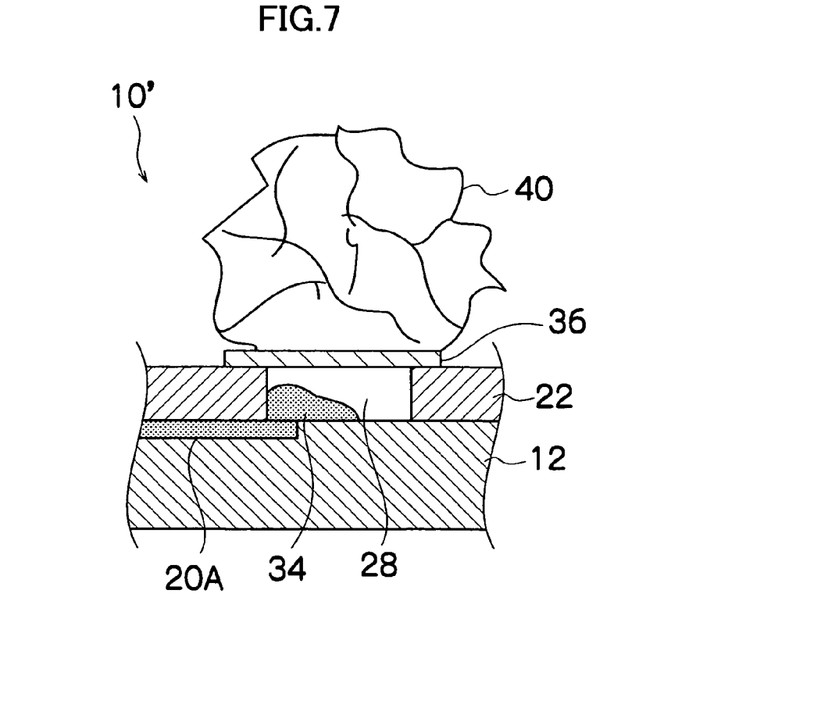
FIG. 7 is a plan view that shows the construction of the second embodiment of the present invention.

And before the start of an experiment, or until the stage of FIG. 4B, as shown in FIG. 7, the third liquid reservoir 28 is covered by use of a tape for sealing sample liquid inlet and outlet 36. In the tape 36, one surface (the bottom surface in the figure) thereof is coated with an adhesive. As a result of this, the third liquid reservoir 28 is shut off from outside air.

Subsequently, as shown in FIG. 7, an ice block 40 is placed on this tape 36. As a result of this, cubic contraction occurs in the air in the interior of the third liquid reservoir 28 due to cooling and the interior of third liquid reservoir 28 comes to a pressure-reduced condition. As a result of this, as shown in FIG. 4C, the sample liquid 34 in the interior of the first liquid reservoir 24 (and the second liquid reservoir 26) is fed into the flow passage 12A (and the flow passage 16A).

When the above-described procedure is followed, as shown in FIG. 7, the sample liquid 34 reaches the third liquid reservoir 28 and the experiment is finished. On that occasion, by delivering sample liquids 34 into the flow passage 14A and the flow passage 16A at the same time from the first liquid reservoir 24 and the second liquid reservoir 26, it is possible to observe how the sample liquids 34 join in at the meeting point 18.

Although the embodiments of a scientific phenomena evaluation device and an educational tool for scientific experiments according to the present invention and of a manufacturing method of the evaluation device and educational tool have been described above, the invention is not limited to the above-described embodiments and it is possible to adopt various kinds of aspects.

For example, in the above-described embodiments, the description has been given of the example of the educational tool for experiments in which two kinds of sample liquids 34 join in at the meeting point 18 and the phenomenon that coloring molecules of coloring matter or pigments diffuse toward a transparent liquid can be observed. However, the educational tool for scientific experiments can also be applied as various educational tools for scientific experiments other than this.

Furthermore, in the above-described embodiments, the first liquid reservoir 24 and the second liquid reservoir 26 are formed on the cover plate 22 and the third liquid reservoir 28 is formed on the base plate 12 or the cover plate 22. However, it is possible to adopt aspects other than this; for example, all liquid reservoirs can be formed on the base plate 12.

Although in the embodiments, three sets of flow passages and liquid reservoirs are provided, it is possible to adopt a constitution in which four or more sets are provided.

Although two different examples were given as the liquid absorption device in the first and second embodiments, it is also possible to adopt other constructions from which similar effects can be obtained.

Furthermore, although the dropper for sample liquid 32 is used to supply a sample liquid (reagent) to the liquid reservoirs (24, 26, etc.), in place of this it is also possible to use an injector, a microsyringe, etc. having the same function. In general, it is desirable to use an inexpensive dropper as an educational tool for scientific experiments. However, according to the purpose of a test, it may sometimes be desirable to use the above-described injector, microsyringe, etc. having the same function.

What is claimed is:

1. A scientific phenomena evaluation device, comprising:
    a base plate on a plate-like surface of which there are formed a plurality of elongated grooves each having a cross-sectional area of not more than 1 mm$^2$; and
    a cover plate that is disposed on a surface of the base plate in close contact therewith and forms a plurality of fine flow passages on the base plate by covering the elongated grooves,
    wherein an end of each of the plurality of fine flow passages joins in at one meeting point and the other end of each of the plurality of fine flow passages is in communication with a liquid reservoir each having a volume of 5 to 5000 mm$^3$;
    a liquid absorption device is provided in one or more of the liquid reservoirs; and
    scientific phenomena in the fine flow passages can be visually recognized.

2. The scientific phenomena evaluation device according to claim 1, wherein the base plate and/or the cover plate is transparent.

3. The scientific phenomena evaluation device according to claim 2, wherein the base plate and/or the cover plate is formed from a resin material.

4. A manufacturing method of the scientific phenomena evaluation device of claim 3, comprising the steps of:
    applying a resin material to a surface of a reverse template on which a reverse shape of the elongated grooves of the base plate are formed;
    causing the resin material to cure; and
    stripping the resin material after curing from the reverse template thereby to form the base plate.

5. An educational tool for scientific experiments, wherein the educational tool is a portable experimental device which comprises the scientific phenomena evaluation device of claim 3.

6. A manufacturing method of the educational tool for scientific experiments of claim 5, comprising the steps of:
    applying a resin material to a surface of a reverse template on which a reverse shape of the elongated grooves of the base plate are formed;
    causing the resin material to cure; and
    stripping the resin material after curing from the reverse template thereby to form the base plate.

7. The scientific phenomena evaluation device according to claim 1, wherein the base plate and/or the cover plate is formed from a resin material.

8. An educational tool for scientific experiments, wherein the educational tool is a portable experimental device which comprises the scientific phenomena evaluation device of claim 1.

9. A manufacturing method of the educational tool for scientific experiments of claim 8, comprising the steps of:
    applying a resin material to a surface of a reverse template on which a reverse shape of the elongated grooves of the base plate are formed;
    causing the resin material to cure; and
    stripping the resin material after curing from the reverse template thereby to form the base plate.

10. A manufacturing method of the scientific phenomena evaluation device of claim 1, comprising the steps of:
    applying a resin material to a surface of a reverse template on which a reverse shape of the elongated grooves of the base plate are formed;
    causing the resin material to cure; and
    stripping the resin material after curing from the reverse template thereby to form the base plate.

11. A scientific phenomena evaluation device, comprising:
    a base plate on a plate-like surface of which there are formed a plurality of elongated grooves each having a cross-sectional area of not more than 1 mm$^2$; and
    a cover plate that is disposed on a surface of the base plate in close contact therewith and forms a plurality of fine flow passages on the base plate by covering the elongated grooves,
    wherein the plurality of fine flow passages comprises a first flow passage, a second flow passage, and a third flow passage, and further wherein an end of the first flow passage and an end of the second flow passage meet each other at one meeting point, the first and second flow passages having almost the same length;
    the other end of the first flow passage is in communication with a first liquid reservoir having a volume of 5 to 5000 mm$^3$;
    the other end of the second flow passage is in communication with a second liquid reservoir having a volume of 5 to 5000 mm$^3$;
    an end of the third flow passage is in communication with the meeting point, the other end of the third flow passage being in communication with a third reservoir having a volume of 5 to 5000 mm$^3$;

a liquid absorption device is provided in one or more of the liquid reservoirs; and scientific phenomena in the flow passages can be visually recognized.

12. The scientific phenomena evaluation device according to claim 11, wherein the base plate and/or the cover plate is transparent.

13. The scientific phenomena evaluation device according to claim 12, wherein the base plate and/or the cover plate is formed from a resin material.

14. The scientific phenomena evaluation device according to claim 13, wherein the liquid absorption device is a device that reduces the pressure in the interior of the third liquid reservoir.

15. An educational tool for scientific experiments, wherein the educational tool is a portable experimental device which comprises the scientific phenomena evaluation device of claim 14.

16. A manufacturing method of the scientific phenomena evaluation device of claim 14, comprising the steps of:
applying a resin material to a surface of a reverse template on which a reverse shape of the elongated grooves of the base plate are formed;
causing the resin material to cure; and
stripping the resin material after curing from the reverse template thereby to form the base plate.

17. A manufacturing method of the educational tool for scientific experiments of claim 15, comprising the steps of:
applying a resin material to a surface of a reverse template on which a reverse shape of the elongated grooves of the base plate are formed;
causing the resin material to cure; and
stripping the resin material after curing from the reverse template thereby to form the base plate.

18. An educational tool for scientific experiments, wherein the educational tool is a portable experimental device which comprises the scientific phenomena evaluation device of claim 13.

19. The scientific phenomena evaluation device according to claim 12, wherein the liquid absorption device is a device that reduces the pressure in the interior of the third liquid reservoir.

20. The scientific phenomena evaluation device according to claim 11, wherein the base plate and/or the cover plate is formed from a resin material.

21. The scientific phenomena evaluation device according to claim 20, wherein the liquid absorption device is a device that reduces the pressure in the interior of the third liquid reservoir.

22. The scientific phenomena evaluation device according to claim 11, wherein the liquid absorption device is a device that reduces the pressure in the interior of the third liquid reservoir.

23. An educational tool for scientific experiments, wherein the educational tool is a portable experimental device which comprises the scientific phenomena evaluation device of claim 11.

24. A manufacturing method of the educational tool for scientific experiments of claim 23, comprising the steps of:
applying a resin material to a surface of a reverse template on which a reverse shape of the elongated grooves of the base plate are formed;
causing the resin material to cure; and
stripping the resin material after curing from the reverse template thereby to form the base plate.

25. A manufacturing method of the scientific phenomena evaluation device of claim 11, comprising the steps of:
applying a resin material to a surface of a reverse template on which a reverse shape of the elongated grooves of the base plate are formed;
causing the resin material to cure; and
stripping the resin material after curing from the reverse template thereby to form the base plate.

* * * * *